(No Model.)

W. HARTY.
VEHICLE SPRING.

No. 347,175. Patented Aug. 10, 1886.

Witnesses
John C. Perkins
John H. Chase

Inventor
William Harty
By Lucius C. West
atty.

UNITED STATES PATENT OFFICE.

WILLIAM HARTY, OF KALAMAZOO, MICHIGAN, ASSIGNOR OF ONE-HALF TO CHESTER D. ROOT, OF SAME PLACE.

VEHICLE-SPRING.

SPECIFICATION forming part of Letters Patent No. 347,175, dated August 10, 1886.

Application filed January 11, 1886. Serial No. 188,176. (No model.)

*To all whom it may concern:*

Be it known that I, WILLIAM HARTY, a citizen of the United States, residing at Kalamazoo, county of Kalamazoo, State of Michigan, have invented a new and useful Vehicle-Spring, of which the following is a specification.

This invention has for its object the construction of an improved spring for side bar vehicles, substantially as below described, and pointed out in the claims.

Figure 1:
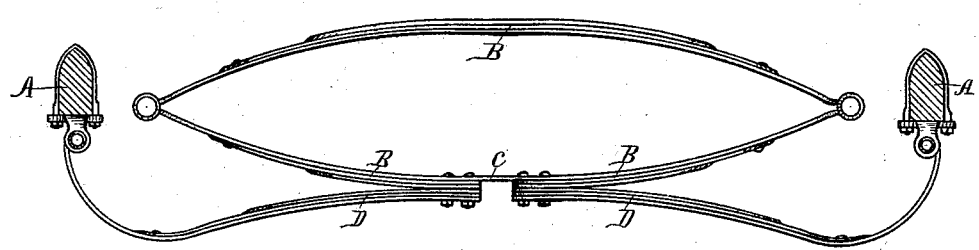
Figure 2:
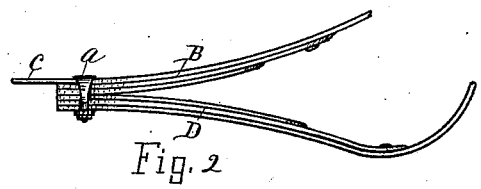

In the drawings forming a part of this specification, Figure 1 is an elevation of the spring connected to the side bars of a vehicle, said side bars being in cross-section; and Fig. 2 is a broken detail showing a change in construction.

Referring to the reference-letters marked on the drawings, B is the ordinary elliptical spring, except the lower leaves are severed and separated, while the lower bar of the spring extends across said separation of the leaves, as at c. Of course the upper and lower bars of this elliptical spring are pivotally connected where they join at the ends, as in other springs. This elliptical spring is supported by lateral spring-bars D D, their inner ends being secured to the spring B on the lower side, each side of the separation of its lower leaves and their outer ends forming connection with the side bars, A A, as in ordinary side-bar vehicles.

In Fig. 1 the spring-bars D D are bolted to the lower bar of the elliptical spring; but they may be adjustably connected by a movable confining-clip, a, as in Fig. 2, by which means the inner ends of the spring-bars D may be nearer each other than shown in Fig. 1, or farther apart, according to the distance between the side bars in different vehicles, thus making the spring laterally adjustable. In such a construction, with the ends of the members of the spring B pivotally connected, and the inner bar of the lower member extending across the division, as at c, the spring is more safely supported, and a better spring action secured than in prior elliptical springs having lateral branches D D.

Having thus described my invention, what I claim as new, and desire to secure by Letters Patent of the United States, is—

1. The elliptical spring having the outer leaves of the lower member severed and separated, and the inner bar of said member extending across said separation, provided with the lateral spring-bars for connection with supporting-bars of a vehicle, said spring-bars secured to the lower member of the elliptical spring, substantially as set forth.

2. The combination of the elliptical spring, the side bars of a vehicle, the lateral spring-bars, and movable confining-clips adjustably securing the spring-bars at their inner ends to the lower member of the elliptical spring, substantially as set forth.

In testimony of the foregoing I have hereunto subscribed my name in presence of two witnesses.

WM. HARTY.

Witnesses:
 JOHN H. CHASE,
 CHESTER D. ROOT.